2,922,745

PURIFICATION OF PROFIBRINOLYSIN

Heron O. Singher, Plainfield, and Jane M. Dressler, Somerville, N.J., assignors to Ortho Pharmaceutical Corporation, a corporation of New Jersey No Drawing. Application January 10, 1958
Serial No. 708,060

9 Claims. (Cl. 167—65)

This invention relates to the preparation and purification of profibrinolysin (plasminogen) and, more particularly, to a process for fractionating profibrinolysin by precipitation of metallic salts thereof. The present application is a continuation-in-part of application Serial No. 611,381, filed September 21, 1956, now abandoned.

It is well established that a proteolytic enzyme is present in normal blood in the form of an inert precursor, profibrinolysin, which is mainly attached to the globulin fraction, for example, Cohn Fraction $III_3$. Profibrinolysin, when activated by bacterial filtrates such as staphylokinase, streptokinase, or by tissue extracts—fibronolysokinase, is converted into fibrinolysin (plasmin) which attacks the coagulation proteins. Inhibitors usually present with the profibrinolysin retard this reaction.

According to the theory of Mullertz and Lassen (Proceedings of the Society for Experimental Biology and Medicine, 82, 264 (1954)), streptokinase and presumably tissue kinases do not activate profibrinolysin directly but an inactive precursor of the activator which would then convert profibrinolysin to fibrinolysin. Regardless, however, of the exact mechanism of fibrinolysis, it has been shown that fibrin is aseptically dissolved by profibrinolysin activated by streptokinase and streptodornase.

The intrathecal use of profibrinolysin activated by streptokinase to lyse tuberculosis exudates in vivo has been reported by Fletcher in the Journal of Clinical Investigations, 33, 1242–1251 (1954). Margulis has described the use of fibrinolysin to liquify blood clots in thirty-eight patients (Archives of Surgery, 65, 511–521, 1952). Activated profibrinolysin also finds use in the debridement of wounds, burns, in the treatment of chronic ulcers, and draining sinuses.

It is the object of the present invention to prepare a highly active and concentrated profibrinolysin.

It is another object of this invention to develop a process for preparing profibrinolysin substantially free of inhibitors.

Many procedures have been developed for the purification and preparation of profibrinolysin. There are methods of Milstone, Christensen, Loomis, Klein, Cohn, Cliffton, etc. Many of these procedures do not lend themselves readily to large scale processing, others yield crude products by modern standards and in still others the over all yields are low. Modern methods of plasma fractionation, such as Cohn's yield fractions that are mixtures, and result in a spreading of the active components across many fractions. In order to obtain an active material in high yield of highly purified proenzyme from many of these sources, it has been necessary to devise a new technique. We have now discovered that profibrinolysin may be purified by adding to an aqueous solution thereof, a water soluble salt of mercury, cadmium, zinc or lead and precipitating under controlled conditions the mercury, cadmium, zinc, or lead salt of profibrinolysin.

Proteins can form compounds of either an ionic nature through ionic bonds or by the formation of complexes through covalent linkages. Under appropriate experimental conditions the nature of the binding can be controlled. Among other materials, heavy metal ions will form bonds of this type. Some heavy metal protein compounds that are formed result in the precipitation of the protein. Since the strength of binding (as measured by the association constant) of the heavy metal ion to the protein is a function of the nature of the bond, it is often possible to obtain molecules whose association constants indicate more firm binding of the same metal than possessed by the protein. These molecules (chelating agents, exchange resins, etc.) can then be used to free the protein of the heavy metal. Similarly, if the physical conditions of the solution are changed, the nature of the binding may be affected and the precipitating agent removed.

Profibrinolysin is stable in highly acid solution (pH range 1 to 5) whereas the same treatment denatures a very large number of other biologically active proteins. Profibrinolysin is also soluble under these conditions and so can be separated from insoluble contaminating material. After this acid extract is neutralized (pH about 6.0–8.0), 1 to 9 millimoles of zinc ion per liter are added. This precipitates out the profibrinolysin. If the pH is less than about 6, impurities are co-precipitated with the profibrinolysin salt. If the pH is greater than about 8, the yield of the precipitated profibrinolysin salt is reduced.

The zinc salt may be further purified by alcohol fractionation (precipitation from alcohol) or the zinc may be removed by dialysis, ion exchange, or chelation. The resultant material may be precipitated by the addition of alcohol or it may be lyophilized. Other heavy metal ions will also induce precipitation, specifically, mercury, cadmium, and lead. The metal salt precipitate is then decomposed by compounds having a greater association constant with respect to the metal than plasminogen, or the metal ions may be removed by dialysis.

The following examples are illustrative of the process and product of the present invention but are not to be construed as limiting.

EXAMPLE I

Two hundred and thirty-four grams of Precipitate $III_3$ (made by methods 6 and 9 of Cohn) which assayed 4000 units per milligram, is extracted with 10 volumes (2340 ml.) of 0.04 N sulfuric acid by stirring for 1 hour at 5° C. (pH 2.1). The insoluble material is removed by centrifugation at 5° C., and the supernatant liquid is adjusted to pH 4.4. The solution is again centrifuged at 5° C., and the residue is discarded. The pH of the supernatant is adjusted to 6.0 with 5 N sodium hydroxide; the solution is again centrifuged at 5° C., and the residue discarded. The supernatant is adjusted to pH 7.2 and the volume of this supernatant is 2350 ml. To this solution is added 23.5 ml. of zinc glycinate solution (about 17 millimoles of zinc ion). The pH is adjusted from 6.8 to 7.2 with 0.7 ml. of 1 N sodium hydroxide and the solution is allowed to stand overnight at 5° C., to assure complete precipitation of the zinc salt. The precipitate is isolated by centrifuging at 5° C., for 30 minutes at 4000 r.p.m. The zinc-plasminogen precipitate weighs 7 grams.

The zinc-plasminogen precipitate is suspended in 7 ml. of water and 7 grams of Dowex 50 (H form) resin is added. Dowex 50 is an organic ion exchange resin having free acid groups, the hydrogen of which is readily replaced by metal ions. The slurry of plasminogen salt and Dowex resin is stirred for 30 minutes at 5° C. The resin is allowed to settle and the supernatant is poured off. The resin is washed by decantation three times with 10 ml.-portions of water and the wash solutions are combined with the supernatant. The total volume of the combined supernatant is adjusted to 50 ml. and the pH of the supernatant is adjusted to 2.1 with 1 N hydrochloric acid.

A second 7-gram portion of Dowex 50 resin (H form) is added to this supernatant and the suspension is stirred at 5° C., for 30 minutes. The supernatant is decanted and the resin is washed twice by decantation with water as described above. The washings are added to the supernatant to give a combined volume of 70 ml.

A third 7-gram portion of Dowex 50 resin (H form) is added to this supernatant and the suspension is stirred at 5° C., for 30 minutes. The supernatant is decanted and the resin is washed twice by decantation with water. The final volume of the combined washings and supernatant is 90 ml. (pH 2.1).

The pH is adjusted to 3.9 by adding 2 ml. of 1 N sodium hydroxide and the solution so obtained is lyophilized. The dried profibrinolysin weighed 0.8 grams and has an activity of 50,000 units per milligram. This represents about a 700-fold increase in purity if compared to pooled human serum that contains about 71 fibrinolytic units of profibrinolysin per milligram of protein solid.

EXAMPLE II

Ten grams of profibrinolysin obtained from the blood of the human placenta and assaying about 500 units per milligram of dry weight was suspended in 10 ml. of 0.05 N sulphuric acid and centrifuged. The supernatant was adjusted to pH 4.5 and again centrifuged. The precipitate was discarded. This solution was adjusted to pH 7 and 5 millimoles of zinc per liter added. The precipitate was removed and 8 milligrams of disodium ethylenediamine tetraacetic acid were added per gram of precipitate. This was dialyzed against distilled water and the dialysate lyophilized. The resultant white powder had 23,000 units per milligram, and is free of thrombin since a 1% solution will not form a clot with a 1% solution of human fibrinolysin within 5 minutes when added thereto and incubated at 37° C.

In determining the activity of the profibrinolysin derived according to Examples I and II, the following method was employed. The House Standard sample of profibrinolysin had an activity of 11,000 units per milligram of dry weight.

*Profibrinolysin assay fibrin clot method*
A. SOLUTIONS (1) Saline—0.9 percent: Dissolve 9 grams of sodium chloride C.P. in 1000 milliliters of distilled water.
(2) Standard profibrinolysin—House Standard: Ten milligrams are weighed on an analytical balance and diluted to 1000 milliliters with saline in a volumetric flask. Make fresh each time.
(3) Unknown solutions:

| | |
|---|---|
| 10 milligrams in 1000 milliliters of saline. | |
| 20 milligrams in 1000 milliliters of saline. | Use 0.4 |
| 20 milligrams in 500 milliliters of saline. | milli- |
| 30 milligrams in 500 milliliters of saline. | liter |
| 20 milligrams in 250 milliliters of saline. | per |
| 10 milligrams in 100 milliliters of saline. | test. |
| 20 milligrams in 10000 milliliters of saline. | |

20 milligrams in 5000 milliliters of saline. Make fresh each time.

(4) Phosphate saline buffer: 0.1 mole monosodium phosphate dissolved in about 600 milliliters of saline in a liter volumetric flask adjusted to pH 7.4 with sodium hydroxide and make to volume. Use 2 milliliters per test. May be stored.
(5) Fibrinogen gelatin solution: Use 2 milliliters per test. Solution contains 2.5 grams of gelatin and 0.5 gram of bovine fibrinogen (Fraction I). Heat 50 milliliters of phosphate saline buffer to boiling, remove from heat and stir in gelatin. Cool to 37° C. and adjust to 50 milliliters with distilled water. Add gelatin solution to 0.5 gram of fibrinogen and mix with a stirring rod in 37° C. water bath until the fibrinogen is dissolved. Keep at 37° C. until used. Make fresh each day.
(6) Streptokinase: Dissolve a 20,000 unit vial in 4 milliliters of saline. Use 0.05 milliliter—250 units—per test. Make fresh each day.
(7) Thrombin: Dissolve thrombin in sufficient saline to give 10 National Institutes of Health units per 0.05 milliliter. Use 0.05 milliliter per test. Make fresh each day.

B. METHOD (1) Set up 10 pairs of photoelectric colorimeter tubes in a rack and number 1 to 10 in duplicate.
(2) To pairs 1 to 9, add 2 milliliters of phosphate saline buffer.
(3) To pair 10, add 2.4 milliliters of phosphate saline buffer (negative control).
(4) To pair 1, add 0.4 milliliter of standard profibrinolysin.
(5) To pairs 2 to 9, add 0.4 milliliter of appropriate unknown.
(6) Add 2.0 milliliters of fibrinogen gelatin to each tube.
(7) Add 0.1 milliliter of saline to the first tube of each pair.
(8) Add 0.05 milliliter of streptokinase to the second tube of each pair.
(9) Mix tubes placing a square of Parafilm over each tube and inverting thrice.
(10) Place racks with tubes in constant temperature water bath at 25° C. immersing to the level of the reagents.
(11) Have photoelectric colorimeter adjusted, wave length 660 mu.
(12) Add 0.05 milliliter of thrombin solution to the second tube of each pair, one every minute in succession. Mix each tube after addition. Start timing from the addition to tube 1.
(13) Use first tube of pair 10 to adjust sensitivity.
(14) Use first tube of each pair for zero adjustment and read transmission before reading transmission of the second tube of the pair.
(15) Read each pair one minute after the preceding pair and once every ten minutes until the second tube of each pair reads 100 percent transmission or until 120 minutes have passed. Record time and transmission for each reading.

C. CALCULATIONS

½ lysis: Subtract the first reading from 100 percent and divide the difference by 2 and add to the first reading. This value is the percent transmission at ½ lysis.

½ lysis time: Make a linear graph plotting transmission on the ordinate and time in minutes on the abscissa. Plot the readings on either side of the calculated ½ lysis. Connect the points and read from the graph the time, corresponding to the calculated ½ lysis. This is the ½ lysis time.

Employing the graph of ½ House Standard (½ lysis time plotted on the ordinate against the units of activity per milligram of House Standard profibrinolysin plotted on the abscissa), check the ½ lysis time of the standard against the unknown. Read the unitage off the curves for each ½ lysis time of the unknown.

$$\frac{\text{Unitage}}{0.4} \times \frac{\text{ml. of saline}}{\text{mgm. in solution}}$$

= activity in units/mg. dry weight

Although human blood was used as the source of profibrinolysin in the preceding examples, any other source of profibrinolysin from mammalian blood, such as bovine blood, may be used and treated by the same process. The process described is effective in obtaining a profibrinolysin free of inhibitors.

What is claimed is:

1. A method of treating profibrinolysin which comprises extracting with a highly acid solution having a pH of about 1 to 5, neutralizing the acid extract to a pH of about 6 to 8, adding to the neutralized extract the water soluble salt of a metal selected from the group consisting of cadmium, mercury, lead and zinc, to precipitate the profibrinolysin as a metal salt, and separating the purified profibrinolysin by treating the precipitate with an ion exchange resin having free acid groups.

2. A method of treating profibrinolysin which comprises extracting with a highly acid solution having a pH of about 1 to 5, neutralizing the acid extract to a pH range of about 6 to 8, adding to the neutralized extract the water soluble salt of a metal selected from the group consisting of cadmium, mercury, lead and zinc, to precipitate the profibrinolysin as a metal salt, and dialyzing the precipitate to remove metal ions from the purified profibrinolysin.

3. A method of treating profibrinolysin which comprises extracting with a highly acid solution having a pH of about 1 to 5, neutralizing the acid extract to a pH range of about 6 to 8, adding to the neutralized extract the water soluble salt of a metal selected from the group consisting of cadmium, mercury, lead and zinc, to precipitate the profibrinolysin as a metal salt, and recovering the purified profibrinolysin by treating the precipitate with disodium ethylenediamine tetraacetic acid.

4. A method of purifying profibrinolysin which comprises suspending the profibrinolysin in a highly acid solution having a pH of about 4.5, separating the acid solution from insoluble contaminating material, neutralizing the acid solution until the pH range is between 6 and 8, adding the water soluble salt of a bivalent metal selected from the group consisting of cadmium, mercury, lead and zinc to precipitate the profibrinolysin from the solution and separating the profibrinolysin from the precipitating metal by treating the precipitate with an ion exchange resin having free acid groups.

5. A process according to claim 1 in which the water soluble metal salt is cadmium salt.

6. A process according to claim 1 in which the water soluble metal salt is a mercury salt.

7. A process according to claim 1 in which the water soluble metal salt is a lead salt.

8. A process according to claim 1 in which the water soluble metal salt is a zinc salt.

9. A purified highly active profibrinolysin, the activity being about 700-fold that of the starting human serum, said profibrinolysin being free of thrombin and substantially free of inhibitors, a 1% solution of said profibrinolysin being incapable of clotting a 1% solution of human fibrinogen within 5 minutes when added thereto and incubated at 37° C.

References Cited in the file of this patent

UNITED STATES PATENTS 2,770,616    Cohn _____ Nov. 13, 1956

OTHER REFERENCES

Kline: J. of Biol. Chem. 204:2, October 1953, pp. 949–955.

Kline: Yale J. of Biol. and Med., 26:5, April 1954, pp. 365–371.

Cliffton: J. Applied Physiology, 6:1, July 1953, pp. 42–50.

Christensen: Proceed. of Soc. for Exper. Biol. and Med., 74:4, August 1950, pp. 840–844.

Tullis: Blood Cells and Plasma Proteins, Acad. Press, N.Y., 1953, pp. 29–41.